United States Patent [19]

Rajan

[11] 4,423,205
[45] Dec. 27, 1983

[54] CATIONIC POLYMERIZATION OF CYCLIC CARBONATES

[75] Inventor: Sundar J. Rajan, Ferndale, Mich.

[73] Assignee: Ethyl Corporation, Richmond, Va.

[21] Appl. No.: 381,207

[22] Filed: May 24, 1982

[51] Int. Cl.$^3$ ............................................. C08G 63/62
[52] U.S. Cl. .................................................. 528/371
[58] Field of Search ....................................... 528/371

[56] References Cited

U.S. PATENT DOCUMENTS

| | | | |
|---|---|---|---|
| 3,301,824 | 1/1967 | Hostettler et al. | 528/371 X |
| 3,758,443 | 9/1973 | Konig et al. | 260/75 |
| 4,079,038 | 3/1978 | Choi et al. | 528/372 X |
| 4,160,853 | 7/1979 | Ammons | 428/425 |

FOREIGN PATENT DOCUMENTS

| | | |
|---|---|---|
| 2222488 | 11/1972 | Fed. Rep. of Germany . |
| 2221751 | 11/1973 | Fed. Rep. of Germany . |
| 2446107 | of 1977 | Fed. Rep. of Germany . |
| 2757086 | 6/1978 | Fed. Rep. of Germany . |
| 2715566 | 10/1978 | Fed. Rep. of Germany . |
| 2903506 | 8/1980 | Fed. Rep. of Germany . |

OTHER PUBLICATIONS

*Journal of the American Chemical Society,* vol. 80, Sarel et al., pp. 4596–4599, (1958).
*Encyclopedia of Polymer Science and Technology,* vol. 10, pp. 710–764, (1969).
*Journal of Organic Chemistry,* vol. 45, Nomura et al., pp. 3735–3738, (1980).
*Angew., Chem. Int. Ed. Engl.* 19, No. 9, Ball et al., pp. 718–719, (1980).

*Primary Examiner*—Lucille M. Phynes
*Attorney, Agent, or Firm*—Donald L. Johnson; John F. Sieberth; John F. Hunt

[57] ABSTRACT

A process for the production of a polycarbonate glycol wherein a cyclic carbonate is catalyzed at elevated temperature by a cationic initiator. Compounds of structure (I)

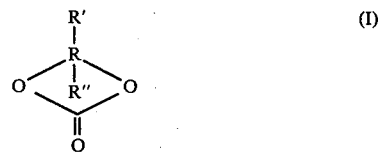

where R is alkylene, R' and R" are independently hydrogen, alkyl, alkaryl, aralkyl, or aryl, are heated at an elevated temperature in the presence of cationic initiators such as trimethyl aluminum to form a polymer. Production of a glycol product is assured by subsequent heating at about 200°–220° C. to form a polymer containing carbonate units of

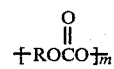

and having hydroxy end units bonded to a carbon not part of a carbonate function. The molecular weight of polycarbonate glycol is preferably at least about 1,000.

17 Claims, No Drawings

CATIONIC POLYMERIZATION OF CYCLIC CARBONATES

BACKGROUND OF THE INVENTION

1. Field of the Invention

The present invention is related in general to polymerization processes and polymers made thereby. The invention is related in particular to processes for the production of polyols and polyurethanes made therefrom.

2. Description of the Prior Art

Polyols, both polyether and polyester glycols are one of three main components which constitute most types of polyurethane elastomers. The polyols also find use in other related plastics, applications, and processes such as reaction injection molding (RIM). Another major component of polyurethane is polyisocyanate material such as toluene diisocyanate (TDI), methylene-bis-diisocyanate (MDI), and other variations thereof. The third major component of polyurethanes is the chain extender which forms larger molecules that provide properties characteristic of polyurethanes. These chain extenders include diethyl toluene diamine (DETDA), 4,4'-methylenebis-o-chloroaniline (MOCA), butanediol, and other aromatic diamines.

The polyol component of polyurethanes normally constitutes about 40–80% of the finished polymer. Polyols used in the past include those of the linear type such as polytetramethylene ether glycol (PTMEG) and those of the branched type such as polypropylene ether glycol (PPG). The linear polyols are normally used in the production of cast elastomers and thermoplastics such as solid tires and wheels, printing reels, conveyor belts, hydraulic hoses, cable jacketing, industrial fiber coating, magnetic tape binders, imitation leather goods, adhesives, elastic fibers, and many other uses.

Polyurethanes made from PTMEG have been shown to be thermally and oxidatively stable with better physical properties than those polyurethanes based, for example, on polypropylene ether glycol (PPG). However, PTMEG is about twice as expensive as the readily available PPG.

The polyester polyols are used in non-foam urethanes and have been shown to have high tensile strength, better high temperature properties, and other more favorable characteristics than the polyether polyurethanes. However, polyurethanes made from polyester polyols tend to have a lower hydrolytic stability than polyurethanes made from polyethers.

There exists a need to produce other hydroxy-terminated polymers for the production of polyurethanes so as to provide products with desirable physical properties including good hydrolytic stability. Especially needed are polyols in the 1,000–2,000 molecular weight range.

SUMMARY OF THE INVENTION

The present invention is directed to the production of polycarbonate glycols and products made therefrom.

The present invention is a process for the production of a polycarbonate glycol, said process comprising heating a cyclic carbonate in the presence of a catalytic amount of a cationic initiator.

The present invention is also a process for the production of a polycarbonate glycol containing units of

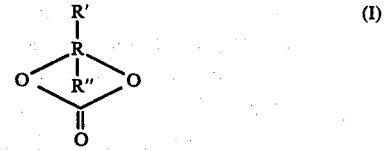

said process comprising heating a cyclic carbonate of structure I:

 (I)

in the presence of a cationic initiator, where R is an alkylene group of 2 or more carbons, and R' and R" are independently hydrogen, alkyl, alkaryl, aralkyl, or aryl.

The present invention is also a polyurethane formed by chain extending a prepolymer composition formed by mixing a polyisocyanate and a polymer containing carbonate units of $$+ROCO+_m$$

and having hydroxy end units, not carbonate end units so as to form a polycarbonate glycol, wherein m is at least about 7, and R is neopentyl, said polymer having a molecular weight of at least about 1,000.

The present invention is also a polyurethane which is the reaction product of:
(a) a polycarbonate glycol formed by heating a cyclic carbonate in the presence of a cationic initiator;
(b) an organic polyisocyanate; and
(c) an organic chain extender having at least two isocyanate-reative hydrogens.

It is therefore an object of the present invention to produce polycarbonate glycols useful in the formation of polyurethanes with good physical properties.

It is also an object of the present invention to provide a process for economically producing polycarbonate glycols useful in the formation of polyurethanes.

It is also an object of the present invention to produce polycarbonate glycols in the molecular weight range of about 400–7,000, preferably 1,000–2,000.

It is still another object of the present invention to provide a process which gives a high yield of polycarbonate glycol in a low temperature process.

It is also an object of the present invention to provide polycarbonate glycols or mixtures of polycarbonate glycols which are in a liquid state from room temperature to processing temperature and therefore more readily handled in, for example, a cast elastomer molding procedure.

Where the catalyzed process described above produces polycarbonates having a high acid number indicating that they may not be hydroxyl terminated, but rather carbonate terminated, the polymer is heated to about 175°–250° C., preferably 200°–220° C., in a subsequent step. This heating step apparently drives off $CO_2$ from the end carbonate function

to produce an OH end group attached to a carbon not part of a carbonate function. The resulting polymer is then found to be reactive with polyisocyanates to form prepolymers for cast elastomers.

DESCRIPTION OF THE PREFERRED EMBODIMENT

The present invention uses cationic catalyzation to promote the growth of a carbonate chain polymer. While the exact mechanism of the process is not completely understood and while Applicant does not wish to be bound by this theory, the cationic initiators of the invention appear to be operating, at the temperature of the inventive process, as given below.

The 5,5-dimethyl-1,3-dioxan-2-one and trimethyl aluminum (TMA) catalyst are exemplary of the proposed mechanism.

An oxonium ion is formed in the heterocyclic ring:

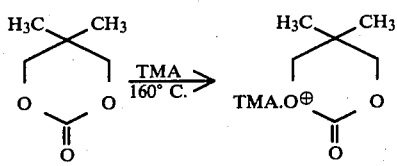

The heterocyclic ring opens to form a catalytic species:

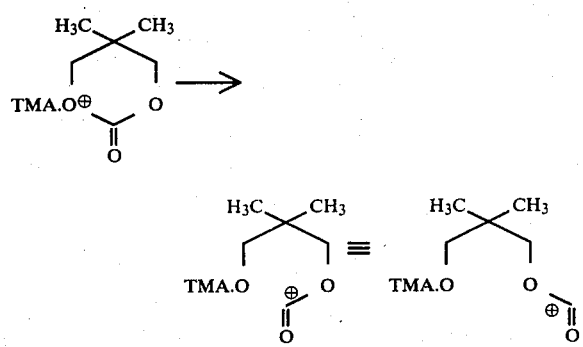

The catalytic species then attacks another heterocyclic ring:

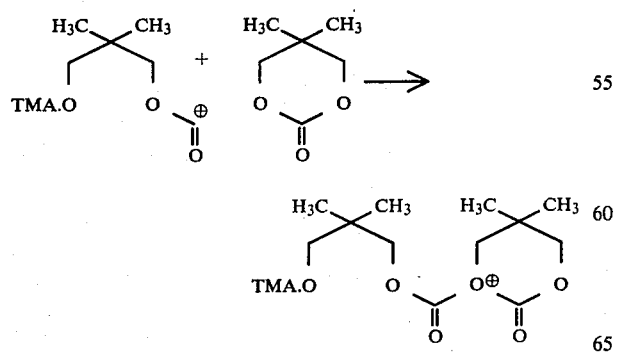

The second ring then opens to form a catalytic species and continue the polymer growth:

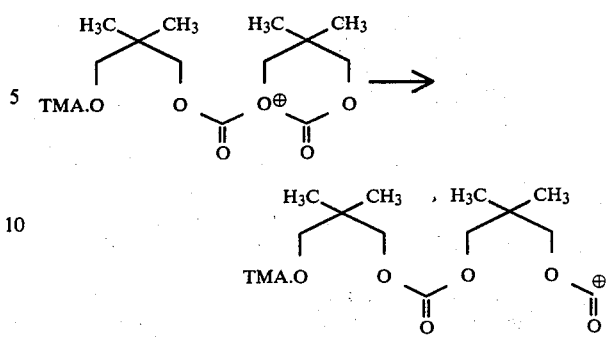

The polymer progression shown above is eventually terminated at substitution of the TMA with a hydrogen ion and attachment of a hydroxyl group, probably from water, at the other end of the polymer chain. This, however, may not form a glycol since analysis shows a high acid number indicating the presence of carbonate end groups. Thus for a process such as the exemplary one described above for 5,5-dimethyl-1,3-dioxan-2-one at 160° C., I have found that subsequent heating at 200°-220° C. apparently replaces a carbonate end group with a hydroxyl group, eliminating $CO_2$.

Analytical results also indicate the presence of ether linkages in the polymer. An infrared spectrum gave small characteristic peaks for hydroxyl (3,600 cm$^{-1}$), and ether (1,110-1,120 cm$^{-1}$) as well as a large peak for carbonyl (1,720 cm$^{-1}$). A possible mechanism for production of ether structures follows. The strong cationic catalyst attacks the heterocyclic ring and forms an oxonium ion as before; but then a $CO_2$ molecule is split off.

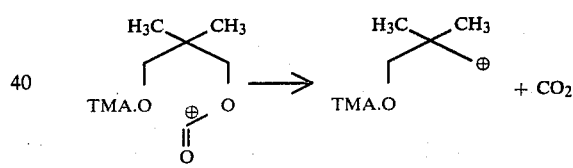

The catalytic species formed then in turn attacks another heterocyclic ring to continue the polymer chain growth.

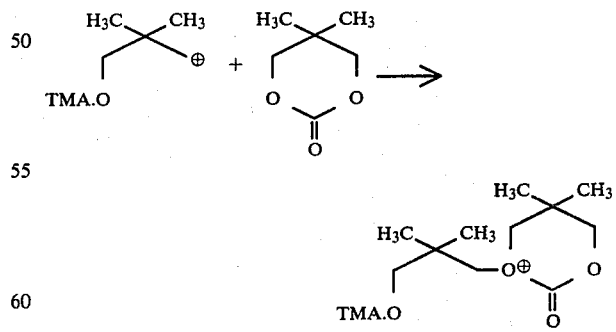

While the above described mechanisms are theoretical, they are in accordance with analytical results and may serve to explain the chemistry of the invention.

The invention is broadly applicable to a large number of starting materials of cyclic carbonate structure having the general formula:

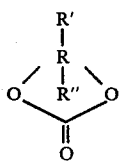

where R is an alkylene of at least two carbon atoms and R' and R" are H, alkyl, alkaryl, aralkyl, or aryl. Thus R includes ethyl, alkyl and aryl-substituted ethyls, n-propyl and substituted n-propyls, as well as various butyl and higher groups.

Other examples of

are:

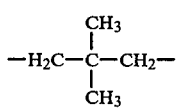

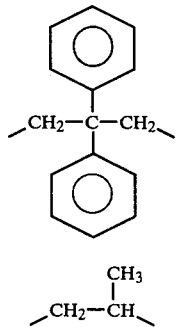

and the like.

A particularly preferred

is the neopentyl group shown above since the cyclic carbonate is readily formed from neopentyl glycol and the resulting polymeric diol (glycol) has properties which make it useful in cast elastomer and reaction injection molding (RIM) applications.

A RIM process is usually conducted at ambient temperature or at 15°-100° C. by subjecting the three major components plus catalyst and additives to static impingement mixing. Often a prepolymer mixture is formed from the polyol component and the chain extender as one stream for injection. Aromatic diamines are frequently used as chain extenders. Polyols in the molecular weight range of 400–7,000 are most frequently used. Often, the polyol is trifunctional for greater crosslinking that makes the molded product more rigid. The diisocyanate or polyisocyanate alone usually forms the other stream to the mix head.

In cast elastomer processes, the components do not react as fast. Thus the mixture is first subjected to vacuum to prevent holes in the cast molded product. The polyisocyanate and polyol are usually first reacted and then cured with a chain extender. The cast elastomer process is carried out at about 25°-150° C. The reaction times are characteristically about 5-10 minutes for cast elastomer processes and about 5-10 seconds for RIM processes.

The process of the invention for making polycarbonate glycols may be carried out within a temperature range of about 50°-250° C., preferably 150°-200° C., depending upon the cyclic carbonate used and the activity of the catalyst. The polymerization heating is frequently carried out at about 160° C. In that case the polycarbonate product is heated, in accordance with the invention, for a short period of time at about 200°-220° C. This assures that the polyol has a lower acid number.

The total times for polymerization and heating may be from one minute to three hours.

Suitable catalysts for the invention are those strong cationic initiators which charge and cleave and heterocyclic ring. The cationic catalysts of the invention include the Lewis Acid catalysts, aluminum alkyls, boron halides, aluminum alkyl halides, and the like. Examples of these are $SnCl_4$, $AlCl_3$, trimethyl aluminum, triethyl aluminum, boron trifluoride, dimethyl aluminum chloride, and other aluminum derivatives.

The products of the invention may be characterized by the use of well-recognized analytical techniques. All of infrared spectroscopy, gel permeation chromatography, saponification number technique, nuclear magnetic resonance spectroscopy, hydroxyl number determination, vapor phase osmometry, high pressure liquid chromatography and other methods may be used.

Some of the polycarbonate glycols of the invention, including some of those which have been subsequently heated above 200° C. where necessary to provide hydroxyl groups bonded to a non-carbonate carbon at each end, are solid at room temperature. Thus it may be desirable to provide the polycarbonate glycol in liquid form for cast elastomer, RIM, or another process. The glycols of the invention may be heated to about 50°-150° C. where necessary to melt the glycol for reaction with a polyisocyanate. Of course, it is to be understood that the polycarbonate glycols of the invention have uses other than for making polyurethanes. These uses include the synthesis of polymeric resins other than polyurethanes.

Another way to provide those glycols of the invention which are solid in a more useable form for polyurethane production is to admix the polycarbonate glycol with another, liquid polyol whether it be a liquid polyol of the invention, a polyether glycol, or a polyester glycol. In this manner, some solid polycarbonate glycols which melt at too high a temperature to make them practicable for polyurethanes, can be made useable. This provides polyurethane end-products with very different physical and structural properties then those made from other polyols. The polyols with which the polycarbonate glycols may be mixed include the conventional polyols such as polyethylene glycols, polyester glycols, and polyether glycols which are usually in the 400–2,000 molecular weight range for polyurethane applications.

Any polyisocyanate such as TDI, MDI, poly-MDI, and other available isocyanates with structures including [OCN-R-NCO] may be used for reaction with the glycols of the invention.

The following non-limiting examples serve to illustrate the invention.

EXAMPLE 1

This example illustrates a method of preparation of a monomer useful in the process of the invention.

A mixture of 208 grams (2 moles) 2,2-dimethyl-1,3-propanediol (neopentyl glycol), 295 grams diethyl carbonate, and 4.3 grams $NaOCH_3$ was placed in a flask equipped with an 18-inch vigreux column and heated gradually to 130° C. About 230 ml ethanol was distilled. When the pot temperature reached 150°–160° C. excess diethyl carbonate was removed under reduced pressure. The resulting product was dissolved in benzene, washed with water, and concentrated. This product was recrystallized from ether and isolated as pure 5,5-dimethyl-1,3-dioxan-2-one. A 75 gram sample had a melting point of 108° C., very nearly matching that in the literature (109° C.).

EXAMPLE 1A

The same general procedure was followed as for Example 1. A mixture of 832 grams (8 moles) 2,2-dimethyl-1,3-propanediol (neopentyl glycol), 1,100 ml (9 moles) diethyl carbonate, and 18 grams (0.33 mole) sodium methoxide was placed in a three-liter, three-neck round bottom flask equipped with overhead stirrer, a thermometer, and distillation equipment with an 18-inch column. The mixture was heated to 120°–125° C. for six hours forming ethanol which was collected (915 ml). The reaction pot temperature stayed below 100° C. The mixture was cooled, covered and stored overnight. The reaction mixture was distilled under reduced pressure (45 mm Hg) to distill off all diethyl carbonate. After 25 ml of product was collected, the remainder was distilled at 4 mm Hg and 155°–160° C. into a two-liter resin kettle. The pot temperature during distillation was about 183°–185° C. The product yield was about 494 grams monomer carbonate.

EXAMPLE 1B

The same general procedure was followed as for Example 1A. Ingredients are 1,040 grams (10 moles) neopentyl glycol, 18 grams (0.33 mole) $NaOCH_3$, and 1,375 ml (11.25 moles) diethyl carbonate, all in a three-liter flask. Followiing the same procedure as Example 1A excess diethyl carbonate was remoed. Then 1,400 ml chloroform was added and the solution stored overnight. The chloroform solution was washed with two 800 ml portions of water, dried, and the carbonate concentrated. The solid concentrate was washed with petroleum ether and dried with a yield of 1,172 grams (90%). Analysis of the product compared to an authentic sample of DMD by NMR technique.

EXAMPLE 2

To a solution of 10 grams (0.08 mole) 5,5-dimethyl-1,3-dioxan-2-one (DMD) in 10 ml methylene chloride, 0.75 ml of (10 mole percent) trimethyl aluminum in hexane was added dropwise. The mixture was stirred overnight with no apparent change in viscosity. After 18 hours the solent had evaporated. The concentrated mixture was heated first to 130° C. where it liquified and then to 160° C.–165° C. whereupon the mixture solidified to a rubbery solid in about two minutes. The polymeric product was cooled to ambient temperature and 10 ml 10% NaOH was added to the product mixture. The mixture was put into 150 ml toluene at 65° C. and the aqueous layer was taken off to remove the catalyst materials. The polymer was dried and precipitated from petroleum ether at 50°–110° C. The product had a melting point of 63°–64° C. and IR analysis showed a typical carbonyl absorption at 1,740 $cm^{-1}$. The product yield on DMD was 49 percent (9.7 grams) with a number average molecular weight of 1,250.

EXAMPLE 3

The procedure followed was generally the same as for Example 2.

About 3.75 ml trimethyl aluminum was dissolved in 10 ml hexane. About five drops of the catalyst solution was added to 50 grams DMD at 150° C. in a flask. The monomer polymerized immediately and the polymer was stored in chloroform.

The product solution was separated into two samples. A first sample was washed with 10% HCl and the second with 10% KOH. The solutions were separately dried, concentrated, and characterized. The sample treated with base (about 15.8 grams) was determined to have a hydroxyl number of 24.27, an acid number 1.62, and a number average molecular weight 1,580.

The sample treated with acid (about 13.5 grams) was determined to have a hydroxyl number 21.14, an acid number 19.38, and a number average molecular weight 2,850. This sample was dissolved in 448 grams chloroform, washed with two 10 ml portions of saturated $NaHCO_3$ and two 10 ml portions of water. The sample was dried with $Na_2SO_4$ and concentrated. Further characterization of the sample gave a number average molecular weight 2,210.

Carbon 13 nuclear magnetic resonance (NMR) spectroscopy of the samples indicates that they are similar and the spectrum is similar to that of the monomer. Thus the acid and base treatments do not appear to adversely affect the polymer.

EXAMPLE 4

The same procedure was followed as for Example 3 except that about 0.5 ml (0.0039 mole) of triethyl aluminum, a less pyrophorric material, was added dropwise to catalyze the polymerization of 50 grams (0.3 mole) DMD at 200° C. in a three-neck round bottom flask. A nitrogen flush was used during catalyst addition. The polymerization took place with evolution of gas within minutes. The rubbery solid product had condensed on the surfaces; it was removed and dissolved in 200 ml chloroform at 50°–75° C. The solution was divided into two samples.

The first sample was treated with two 20 ml portions of 10% KOH and two 20 ml portions of water before drying with $Na_2SO_4$. The product was then filtered and concentrated with a yield of 15.1 grams. Hydroxyl number was 17.1; acid number: none found; number average molecular weight was 4,720.

The second sample was treated with two 25 ml portions of 10% HCl and a 25 ml portion of water. The sample was dried with $Na_2SO_4$ and filtered three times with a diatomaceous earth analytical filter.

The white precipitate was separated by filtration and the chloroform solution was concentrated to give a polymer yield of 11.8 grams. Hydroxyl number was 10; acid number-none found.

EXAMPLE 5

About 25 grams DMD in 160 ml o-xylene was heated to reflux (140°–145° C.). A solution of 1.8 ml trimethyl aluminum in 10 ml o-xylene was prepared and added dropwise to the refluxing solution over a period of 20 minutes. A gas evolved and the solution was brought to room temperature after stirring for 25 minutes at 140°–150° C. About 20 ml water was added and the mixture was stored overnight. The sample was concentrated and the xylene solvent was removed by petroleum ether wash and filtration with aspirator pressure. The 15.8 grams of product (63+% yield) had a melting point of about 83° C. The acid number was 42.8; saponification number was 83.8; and hydroxyl number was 11.5.

EXAMPLE 6

About 350 grams (2.7 moles) DMD was taken up on a two-liter kettle continuously flushed with nitrogen and heated to 135° C. for 30 minutes. A solution of 3 grams (3.7 ml) triethyl aluminum in 0.75 ml hexane was prepared and added dropwise to the heated DMD. Evolution of gas and formation of a white solid powder was observed. The reaction mixture was stirred five minutes and cooled to about 75° C. About 300 ml chloroform and then 50 ml 10% NaOH were added. After cooling to ambient temperature, the organic layer was separated, water washed, dried with $Na_2SO_4$ and concentrated. The concentrate was heated to about 200° C. and cooled to room temperature. The yield was 270.4 grams polymer having acid number 4.9; hydroxyl number 139; and a number average molecular weight of 370. Gel permeation chromatography indicated the presence of about 50% monomer still in the polymer. The weight average molecular weight was about 800.

EXAMPLE 7

The same general procedure was followed as for Example 6. The monomer DMD used was obtained in part by distillation from the product mixture in Example 6. The remainder was synthesized. The combined DMD portions were boiled at 120° C., 1 mm Hg to provide 439 grams. About 4.6 ml triethyl aluminum was mixed with 5 ml hexane.

The DMD was in this case heated at about 150° C. for 30 minutes in a two-liter kettle, the catalyst solution was added dropwise, and the kettle was kept at 150° C. for an additional ten minutes, all under nitrogen atmosphere. About 100 ml 15% NaOH was added to the product. After cooling to 90° C. or below, 300 $CHCl_3$ were added. The reaction mixture rapidly cooled to 60° C. The organic layer was separated, washed with 100 ml water, dried with $Na_2SO_4$, and concentrated by distillation. The concentrated polymer was then heated to 200° C. for about one hour and cooled for analysis. The yield was 354 grams (81%) of polymer which analyzed as follows:

Hydroxyl Number 104 (molecular weight 1,078 1.85 meq/gram)
Acid Number 0.3
Saponification Number 209
Gel Permeation Chromatography:
  number average molecular weight—794
  weight average molecular weight—2,187.
Vapor Pressure Osmometry:
  number average molecular weight—984

EXAMPLE 8

The same general procedure was followed as for Examples 6 and 7. A first attempt to polymerize DMD gave a yellowish product attributed to residual basic catalyst ($NaOCH_3$) from preparation of the monomer. The addition funnel plugged and the product (25% yield) was scrapped.

A fresh batch of DMD, 1,000 grams, from Example 1B was taken up in a three-liter resin kettle and polymerized at 150° C. for ten minutes with a solution of triethyl aluminum, 5 ml in 5 ml hexane. The organic layer was water washed and the cholorform removed.

The concentrated product was heated at 200° C. for three hours and the volatiles were removed under reduced pressure (3 mm Hg). The yield was 600 grams polymer with a hydroxyl number of 95 and a weight average molecular weight 1,184. Gel permeation chromatography indicates a weight average molecular weight of 2,063 and a peak average molecular weight of 4,459.

This result indicates that the polymerization and heating step can be carried out simultaneously at 200° C. but that a higher molecular weight polymer, probably about 4,000, will be formed. Compare Example 6 at 135° C. and relatively low m.w. with this example at 150° C. and intermediate m.w. and with Example 4 at 200° C. and relatively high m.w.

EXAMPLES 9–11

These examples demonstrate preparation of a prepolymer reaction mixture for polyurethane formation. These examples also demonstrate the composition of a known glycol with a glycol of the invention. Both polymers were degassed for one and one-half hours at about 3 mm Hg. The reactions and transfers were carried out under nitrogen atmosphere and the glassware used for toluene diisocyanate (TDI) transformations was washed with an aqueous solution of 8 percent concentrated $NH_4OH$ and 2 percent detergent (a TDI decontaminant) immediately after use.

9. A mixture of 150 grams polycarbonate glycol of the invention from Example 8 and 150 grams polytetramethylene ether glycol (PTMEG) from Quaker Oats Company were degassed for one-half hour (90° C. <3 mm/Hg) and cooled to 50° C. in a one-liter resin kettle. To the heated kettle was added 61 ml TDI from EASF Wyandotte, over a period of ten minutes. The mixture was heated for 90 minutes at 130° C. whereupon a sample analyzed at 4.43 percent NCO content. An additional 14 ml TDI was added to the prepolymer mixture and heated to 80° C. for 30 minutes. NCO content was 6.48 percent. The prepolymer was pourable at 50°–80° C.

10. A second mixed glycol was prepared by the above process used PTMEG from Quaker Oats Company. About 75 ml BASF Wyandotte TDI was added to the mixture of 150 grams each of PTMEG and the glycol from Example 8 with heating at 45°–50° C. The preparation procedures of Quaker Oats Bulletin 208 were followed. The NCO content was found to be 5.58 percent. The prepolymer was pourable at 85°–95° C.

11. Another prepolymer mix was prepared from TDI and the polycarbonate glycol of Example 7. About 53 ml TDI was added to 300 grams of the glycol in 200 ml chloroform at 35° C. The chloroform was distilled out and heated at 135° C. for three and one-half hours whereupon the NCO content was determined to be 1.44 percent. The mixture was heated to 100°-120° C. and an additional 45 ml TDI was added and stirred for 30 minutes. The yield was 360 grams with NCO content of 5.97 percent. However, the prepolymer was pourable only at 120°-150° C.

EXAMPLE 12

The TDI-terminated prepolymer (100 grams) from Example 10 was heated to 95° C. and degassed in an Erlenmeyer flask. About 17.2 grams 4,4'-methylenebis-(orthochloroaniline) (MOCA) was melted at 120° C. and blended with the prepolymer. The homogeneous mixture was degassed and poured into a preheated mold. The pot life was only 60 seconds which indicates the usefulness of the prepolymer mix for reaction injection molding (RIM) techniques in static impingement mixers. The cast elastomer template contained few bubbles. The template was cured at 100° C. in an air-circulated oven for one hour and then post-cured for two weeks at ambient temperature. The fresh portion of the TDI-terminated prepolymer of Example 11 was heated to 90° C. and chain extended with MOCA. The cure time was faster than that of a TDI-terminated prepolymer of PTMEG alone. One day later, a portion of the prepolymer from Example 11 was heated to 90° C. but thereupon self-polymerized. The self-polymerization may be attributed to reaction with moisture or insufficient reaction time during preparation of the prepolymer. However, the latter is not indicated since "% NCO" calculations based upon hydroxyl number indicate that the reaction was complete.

EXAMPLE 13

Polyurethane plaques were molded from both the mixed glycol prepolymer of Example 8 and a commercial prepolymer mix having 6-6.5 percent NCO content and sold by duPont under the trademark Adiprene L-167.

(A) About 100 grams of the duPont prepolymer L-167 was chain extended with 19.5 grams MOCA at 80° C., molded, cured for one hour at 100° C., and post-cured for 16 hours at 100° C.

(B) Approximately 100 grams L-167 prepolymer was chain extended with 29.38 grams of duPont's Caytur 21 ™ chain extender at 80° C., molded, cured for one hour at 130° C., and post-cured for 16 hours at 130° C.

(C) The mixed glycol prepolymer, 100 grams, was chain extended with 32.5 grams Caytur 21 ™ curing agent at 60° C., molded, cured for one hour at 130° C., and post-cured for 16 hours at 130° C. The physical properties of the plaques made in A, B, and C were measured and are given in the Table below.

TABLE

| Physical Properties of Polyurethane Elastomers | | | |
|---|---|---|---|
| | A | B | C |
| Shore A Hardness | 94 | 87 | 94 |
| Modulus, 100% (psi) | 1,762 | — | — |
| Modulus, 200% (psi) | — | 1,513 | 1,538 |
| Modulus, 300% (psi) | 3,095 | 2,026 | 2,051 |
| Tensile Strength (psi) | 5,952 | 2,329 | 2,359 |
| Elongation (%) | 420 | 420 | 420 |

The Shore A Hardness was determined with a Rex Durometer A. The Elongation was tested on an Instron machine using the ASTM-412 procedure. The physical properties of A and B (commercial materials) are considered good and the properties of C (materials of the invention) compare favorably.

The mixed glycol prepolymer of the invention reacted too fast with MOCA, leaving bubbles in the plaque.

While certain aspects of the invention have been used to demonstrate its operability and usefulness, various parameters may be adjusted according to need, within the scope and spirit of the invention which are defined by the appended claims.

I claim:

1. A process for the production of a polycarbonate glycol, said process comprising heating a cyclic carbonate in the presence of a catalytic amount of a cationic initiator.

2. The process of claim 1 wherein said cationic initiator is a member selected from the group consisting of Lewis Acids, aluminum alkyls, boron halides, and aluminum alkyl halides.

3. The process of claim 2 wherein said member is an aluminum alkyl.

4. The process of claim 3 wherein said aluminum alkyl is trimethyl aluminum.

5. The process of claim 3 wherein said aluminum alkyl is triethyl aluminum.

6. The process of claim 1 wherein the polymerization is carried out at least 50°-250° C.

7. The process of claim 6 wherein said process is carried out at about 150°-200° C.

8. The process of claim 1 wherein the polymerization is carried out in an organic solvent.

9. The process of claim 8 wherein said solvent is hexane or xylene.

10. The process of claim 1 further comprising the subsequent step of heating the polymerized product at about 200°-220° C.

11. A process for the production of a polycarbonate glycol containing units of

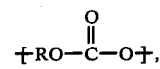

said process comprising heating a cyclic carbonate of structure I:

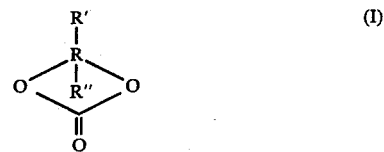

in the presence of a cationic initiator, where R is an alkylene group of 2 or more carbons, and R' and R" are independently hydrogen, alkyl, alkaryl, aralkyl, or aryl.

12. The process of claim 11 wherein the cyclic carbonate is 1,3-dioxan-2-one of structure II:

13. The process of claim 12 wherein the cyclic carbonate is 5,5-dimethyl-1,3-dioxan-2-one

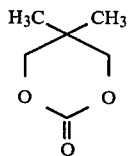

14. The process of claim 11 wherein the cationic initiator is triethyl aluminum and the carbonate is heated at about 135°–200° C.

15. The process of claim 14 and further comprising subsequently heating the product so formed at about 200°–220° C.

16. The polycarbonate glycol product formed by the process of claim 11.

17. The process of claim 1 further comprising the subsequent step of mixing the product from heating the cyclic carbonate with a basic solution and then recovering the polycarbonate glycol from the mixture so formed.

* * * * *

UNITED STATES PATENT AND TRADEMARK OFFICE
CERTIFICATE OF CORRECTION

PATENT NO. : 4,423,205
DATED : December 27, 1983
INVENTOR(S) : SUNDAR J. RAJAN

It is certified that error appears in the above-identified patent and that said Letters Patent is hereby corrected as shown below:

Column 2, line 38, "reative" should read -- reactive --.

Column 4, line 17, "at substitution" should read
-- by substitution --.

Column 6, line 21, "cleave and" should read -- cleave the --.
line 60, "then those" should read -- than those --.

Column 7, line 48, "Followiing" should read -- Following --.
line 49, "remoed" should read -- removed --.
line 64, "solent" should read -- solvent --.

Column 10, line 47, "EASF" should read -- BASF --.

Signed and Sealed this

First Day of May 1984

[SEAL]

Attest:

GERALD J. MOSSINGHOFF

Attesting Officer    Commissioner of Patents and Trademarks